(12) United States Patent
Arai et al.

(10) Patent No.: US 6,778,241 B1
(45) Date of Patent: Aug. 17, 2004

(54) SUBSTRATE FOR LIQUID CRYSTAL DISPLAY ELEMENTS

(75) Inventors: Daisuke Arai, Osaka (JP); Etsuo Ogino, Osaka (JP)

(73) Assignee: Nippon Sheet Glass Co., Ltd. (JP)

( * ) Notice: Subject to any disclaimer, the term of this patent is extended or adjusted under 35 U.S.C. 154(b) by 159 days.

(21) Appl. No.: 09/713,400

(22) Filed: Nov. 15, 2000

(30) Foreign Application Priority Data

Nov. 17, 1999 (JP) .............................. 11-326859
Jul. 6, 2000 (JP) ...................................... 2000-204952

(51) Int. Cl.$^7$ ......................................... G02F 1/1335
(52) U.S. Cl. ....................................... 349/114; 349/105
(58) Field of Search ........................ 428/428; 359/359, 359/586; 349/114, 113, 137

(56) References Cited

U.S. PATENT DOCUMENTS

| | | | | |
|---|---|---|---|---|
| 4,185,894 A | * | 1/1980 | Hilton et al. ................ | 349/114 |
| 4,456,336 A | * | 6/1984 | Chung et al. ................ | 349/160 |
| 4,515,441 A | * | 5/1985 | Wentz .......................... | 359/448 |
| 4,883,343 A | * | 11/1989 | Teshirogi ..................... | 349/137 |
| 5,058,997 A | * | 10/1991 | Dickerson et al. ........... | 349/105 |
| 5,198,930 A | * | 3/1993 | Muratomi .................... | 359/583 |
| 5,245,468 A | * | 9/1993 | Demiryont et al. .......... | 359/359 |
| 5,496,621 A | * | 3/1996 | Makita et al. ............... | 428/216 |
| 5,510,215 A | * | 4/1996 | Prince et al. ................. | 430/7 |
| 5,532,851 A | * | 7/1996 | Usami ......................... | 349/117 |
| 5,935,716 A | * | 8/1999 | McCurdy et al. ........... | 428/428 |
| 5,978,056 A | * | 11/1999 | Shintani et al. ............. | 349/137 |
| 5,990,995 A | * | 11/1999 | Ebihara et al. ............. | 349/113 |
| 6,137,630 A | * | 10/2000 | Tsou et al. ................... | 359/586 |
| 6,208,466 B1 | * | 3/2001 | Liu et al. ..................... | 359/584 |
| 6,231,992 B1 | * | 5/2001 | Niebauer et al. ........... | 428/472 |
| 6,317,179 B1 | * | 11/2001 | Kamiya ....................... | 349/78 |
| 6,452,654 B2 | * | 9/2002 | Kubo et al. ................. | 349/114 |

FOREIGN PATENT DOCUMENTS

JP    11-2709    1/1999

* cited by examiner

*Primary Examiner*—Kenneth Parker
(74) *Attorney, Agent, or Firm*—Rossi & Associates

(57) ABSTRACT

A substrate for liquid crystal display elements is provided, which can meet a variety of required optical characteristics and, at the same time, improve the utilization factor of light without the possibility of inducing a signal delay. A predetermined number of pairs of a transparent film having a high refractive index and a transparent film having a low refractive index, each composed of a dielectric material, are stacked on a transparent substrate. The high refractive index transparent film and the low refractive index transparent film have refractive indices of light of not less than 1.8 and not more than 1.5 at a wavelength of 550 nm, respectively. The predetermined number of pairs is 1 or more, and the high refractive index transparent film and the low refractive index transparent film each have a film thickness thereof set to such a value that the light reflectance in a visible light region of each of the transparent films is within a range of 5–95%.

27 Claims, 5 Drawing Sheets

SUBSTRATE FOR LIQUID CRYSTAL DISPLAY ELEMENTS

BACKGROUND OF THE INVENTION

1. Field of the Invention

The present invention relates to a substrate for liquid crystal display elements, and more particularly, to a substrate for liquid crystal elements for use in semi-transparent type liquid crystal display elements which partially transmit light.

2. Prior Art

In recent years, in order to meet demand for thinner and more lightweight portable electronic devices and apparatuses as well as requirements for a longer battery driving time, reflective-type liquid crystal display elements utilizing external light have become used to realize low electric power consumption liquid crystal displays. However, since the display quality (especially in terms of contrast) of such reflective-type liquid crystal display elements rely heavily on external light, it is not possible to obtain sufficient brightness in a dark place compared with transparent-type liquid crystal display elements which utilize back light, leading to a degraded picture quality. One method to overcome this problem has been proposed by Japanese Laid-Open Patent Publication (Kokai) No. 11-002709 which provides a semi-transparent type liquid crystal display element using a semi-transparent plate as a reflector so that the element may be used both as a reflective type in a bright place and a transparent type using back light in a dark place.

A substrate for liquid crystal display elements used in this semi-transparent type liquid crystal display element has a liquid crystal layer interposed between a pair of transparent substrates provided with liquid crystal-driving electrodes, such that a light scattering characteristic of the liquid crystal layer is controlled by the magnitude of voltage applied to the liquid crystal layer. Further, this substrate has such a structure that a semi-transparent reflector formed of metal, such as aluminum, is stacked on a substrate on a backside, wherein the semi-transparent reflector is formed of a metallic thin film which has a thickness reduced to such a degree that light can partially be transmitted through the film.

However, to obtain such a metallic thin film with a reduced thickness, it is necessary to make the film thickness extremely thin to suppress the reflection of light and hence increase the degree of light transmittance. Therefore, a high degree of control of the thickness of the film is required during the manufacturing process, thus making it difficult to realize such a thin metallic film. Moreover, even if the film thickness is reduced, light is absorbed during transmission of light so that the utilization factor of light is low.

Further, when the liquid crystal is driven, capacitance occurs between the metallic thin film and transparent electrodes (transparent conductive films), which induces a signal delay, and thus there is a possibility that the speed of a drive signal for driving the liquid crystal display element lowers.

SUMMARY OF THE INVENTION

It is therefore an object of the present invention to provide a substrate for liquid crystal display elements which can meet a variety of required optical characteristics and, at the same time, can improve the utilization factor of light without the possibility of inducing a signal delay.

To attain the above object, the present invention provides a substrate for liquid crystal display elements comprising a transparent substrate, and a predetermined number of pairs of a first transparent film having a high refractive index and a second transparent film having a low refractive index, each composed of a dielectric material and stacked on the transparent substrate, wherein: the first transparent film has a refractive index of light of not less than 1.8 at a wavelength of 550 nm, and the second transparent film is stacked on the first transparent film and has a refractive index of light of not more than 1.5 at the wavelength of 550 nm; the predetermined number is an integer not less than 1; and the first transparent film and the second transparent film each have a film thickness thereof set to such a value that the light reflectance in a visible light region of each of the first and second transparent films is within a range of 5–95%.

According to the substrate of the present invention, it is possible to meet a variety of required optical characteristics, for example, it is possible to freely set the ratio between light transmittance and light reflectance in the visible light region of each transparent film over a wide range according to applications, and in addition, it is possible to improve the utilization factor of light since a transparent film having a high refractive index and a transparent film having a low refractive index, each composed of a dielectric material, are used. Further, since neither of the transparent films is composed of a metallic thin film, the possibility of inducing a signal delay can be eliminated.

Preferably, the substrate for liquid crystal display elements includes a transparent roughened surface scattering layer stacked on the transparent substrate.

As a result, glare by reflection of light can be suppressed.

It is preferable that the light reflectance in the visible light region of each of the first and second transparent films is in a range of not less than 5% but less than 25%, wherein: when the predetermined number is 1, the first transparent film has a film thickness of 20–130 nm, and the second transparent film has a film thickness of 50–110 nm; when the predetermined number is 2, the first transparent film has a film thickness of 5–60 nm, and the second transparent film has a film thickness of 5–150 nm; when the predetermined number is 3, the first transparent film has a film thickness of 3–80 nm, and the second transparent film has a film thickness of 5–160 nm; and when the predetermined number is 4, the first transparent film has a film thickness of 5–80 nm, and the second transparent film has a film thickness of 5–80 nm.

It is also preferable that the light reflectance in the visible light region of each of the first and second transparent films is in a range of not less than 25% but less than 45%, wherein: when the predetermined number is 1, the first transparent film has a film thickness of 80–110 nm, and the second transparent film has a film thickness of 40–60 nm; when the predetermined number is 2, the first transparent film has a film thickness of 20–180 nm, and the second transparent film has a film thickness of 30–100 nm; when the predetermined number is 3, the first transparent film has a film thickness of 10–130 nm, and the second transparent film has a film thickness of 10–170 nm; when the predetermined number is 4, the first transparent film has a film thickness of 20–110 nm, and the second transparent film has a film thickness of 5–100 nm; when the predetermined number is 5, the first transparent film has a film thickness of 10–110 nm, and the second transparent film has a film thickness of 5–110 nm; and when the predetermined number is 6, the first transparent film has a film thickness of 10–80 nm, and the second transparent film has a film thickness of 30–100 nm.

Further, it is preferable that the light reflectance in the visible light region of each of the first and second transparent films is in a range of not less than 45% but less than 65%, wherein: when the predetermined number is 2, the first transparent film has a film thickness of 60–180 nm, and the second transparent film has a film thickness of 40–90 nm; when the predetermined number is 3, the first transparent film has a film thickness of 20–160 nm, and the second transparent film has a film thickness of 10–150 nm; when the predetermined number is 4, the first transparent film has a film thickness of 20–180 nm, and the second transparent film has a film thickness of 10–110 nm; when the predetermined number is 5, the first transparent film has a film thickness of 30–190 nm, and the second transparent film has a film thickness of 10–140 nm; when the predetermined number is 6, the first transparent film has a film thickness of 10–150 nm, and the second transparent film has a film thickness of 10–100 nm; when the predetermined number is 7, the first transparent film has a film thickness of 20–150 nm, and the second transparent film has a film thickness of 5–110 nm; when the predetermined number is 8, the first transparent film has a film thickness of 20–130 nm, and the second transparent film has a film thickness of 5–110 nm; and when the predetermined number is 9, the first transparent film has a film thickness of 20–120 nm, and the second transparent film has a film thickness of 10–90 nm.

It is also preferable that the light reflectance in the visible light region of each of the first and second transparent films is in a range of not less than 65% but less than 95%, wherein: when the predetermined number is 3, the first transparent film has a film thickness of 80–160 nm, and the second transparent film has a film thickness of 40–110 nm; when the predetermined number is 4, the first transparent film has a film thickness of 60–140 nm, and the second transparent film has a film thickness of 40–100 nm; when the predetermined number is 5, the first transparent film has a film thickness of 30–130 nm, and the second transparent film has a film thickness of 20–170 nm; when the predetermined number is 6, the first transparent film has a film thickness of 20–180 nm, and the second transparent film has a film thickness of 10–140 nm; when the predetermined number is 7, the first transparent film has a film thickness of 10–150 nm, and the second transparent film has a film thickness of 30–130 nm; when the predetermined number is 8, the first transparent film has a film thickness of 5–200 nm, and the second transparent film has a film thickness of 5–150 nm; and when the predetermined number is 9, the first transparent film has a film thickness of 5–200 nm, and the second transparent film has a film thickness of 5–140 nm.

Since the thickness of each of the transparent film having a high refractive index and the transparent film having a low refractive index can thus be set over a predetermined range, the light reflectance in the visible light region can be set over a wide range, making it possible to meet a variety of required optical characteristics.

Preferably, the second transparent film is formed of a material having a low refractive index consisting essentially of at least one compound selected from the group consisting of silicon dioxide, magnesium fluoride, calcium fluoride, and lithium fluoride.

Silicon dioxide is particularly preferable because of its excellent chemical durability.

In a preferred embodiment of the present invention, the second transparent film includes a transparent film located farthest from the transparent substrate, the transparent film being formed of silicon dioxide and having a film thickness of not less than 20 nm.

As a result, it is possible to improve the degree of adhesion of the low refractive index transparent film which is located farthest from the transparent substrate, to other materials such as a color filter coated on the transparent thin film.

In a further preferred embodiment of the present invention, the first transparent film is formed of a material having a high refractive index consisting essentially of at least one compound selected from the group consisting of titanium dioxide, zirconium dioxide, tantalum pentoxide, and tin oxide.

The above and other objects, features and advantages of the invention will become more apparent from the following detailed description taken in conjunction with the accompanying drawings.

BRIEF DESCRIPTION OF THE DRAWINGS

FIGS. 4A and 4B are graphical representations of optical characteristics of examples of the substrate for liquid crystal display elements according to the present invention and comparative examples of the conventional substrate for liquid crystal display elements, in which:

FIG. 4A is a graphical representation of optical characteristics of Examples Nos. 1 and 2; and FIG. 4B is a graphical representation of optical characteristics of Comparative Examples Nos. 1 and 2.

DETAILED DESCRIPTION

The present invention will now be described in detail with reference to the drawings showing preferred embodiments thereof.

To attain the object, the present inventors conducted extensive studies and reached a finding that, if a predetermined number of pairs of a transparent film having a high refractive index (hereinafter referred to as "the high refractive index transparent film") and a transparent film having a low refractive index (hereinafter referred to as "the low refractive index transparent film"), each composed of a dielectric material, are stacked on a transparent substrate, and the refractive index of light of the high refractive index transparent film is not less than 1.8 at a wavelength of 550 nm, and the low refractive index transparent film is stacked on the high refractive index transparent film and has a refractive index of light of not more than 1.5 at the wavelength of 550 nm, and further, if the predetermined number of pairs is 1 or more, and the film thicknesses of the high refractive index transparent film and the low refractive index transparent film are set to such values that the light reflectance in the visible light region of each transparent film is within a range of 5–95%, it is possible to meet a variety of required optical characteristics and, at the same time, improve the utilization factor of light and further, eliminate the possibility of inducing a signal delay.

That is, according to a substrate for liquid crystal display elements of the present invention, it is possible to meet a variety of required optical characteristics, for example, it is possible to freely set the ratio between light transmittance and light reflectance in the visible light region of each transparent film over a wide range according to applications, thereby improving the utilization factor of light. Further, since the high and low refractive index transparent films are composed of dielectric materials instead of a metallic thin film, capacitance does not occur between the transparent films and the transparent electrodes, and consequently the possibility of inducing a signal delay can be eliminated.

Further, since the difference between the maximum value and minimum value of the light reflectance of wavelength components, red (R), green (G), and blue (B) in the visible light region can be kept at approximately 10% or less, optical characteristics which are flat over a wide range in the visible light region can be obtained.

The present invention is based upon the above findings.

A substrate for liquid crystal display elements according to an embodiment of the present invention will now be described in detail with reference to FIG. 2.

Figure 2:
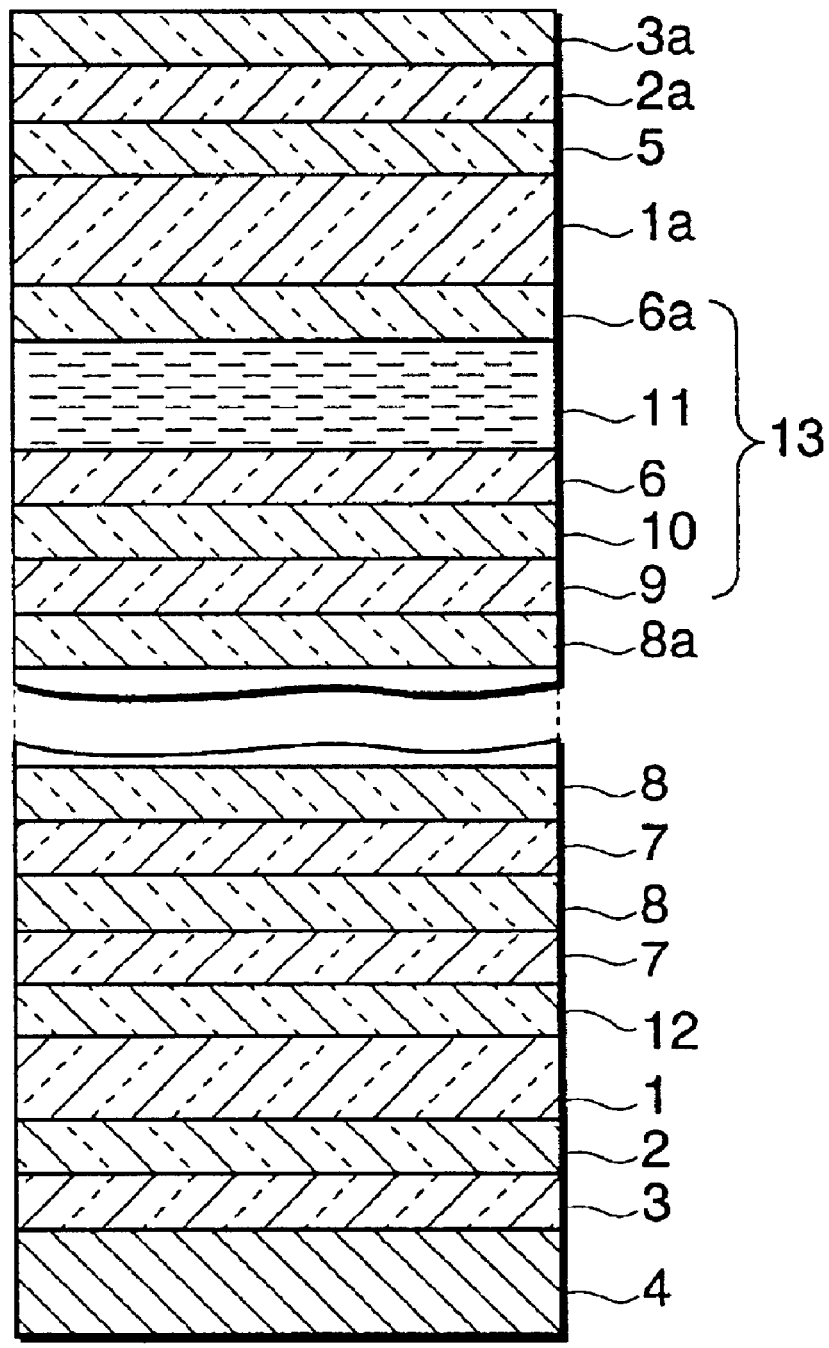
FIG. 2 is a cross-sectional view showing a laminated structure of a liquid crystal display element manufactured by using a substrate for liquid crystal elements according to an embodiment of the present invention.

FIG. 2 is a cross-sectional view of a laminated structure of a liquid crystal display element manufactured by using a substrate for liquid crystal elements according to an embodiment of the present invention. In FIG. 2, a pair of transparent substrates 1 and 1a are arranged in opposed relation to each other, with the transparent substrate 1 facing a back side and the transparent substrate 1a facing a front side. On an outer surface of the transparent substrate 1a, a diffusion plate 5, a phase difference plate 2a, and a polarizing plate 3 are stacked in the mentioned order, while on an inner surface of the transparent substrate 1a, a transparent conductive film 6a composed of indium-tin-oxide (ITO) or the like is stacked. On an outer surface of the transparent substrate 1, a phase difference plate 2 and a polarizing plate 3 are stacked in the mentioned order, and further, on an outer surface of the polarizing plate 3, a back light 4 which acts as a light source is arranged.

The transparent substrates 1 and 1a may be ordinary glass substrates which are commonly used. However, this is not limitative, but other substrates such as substrates formed of soda lime glass, and transparent plastic or the like, may be used as the transparent substrates 1 and 1a. When a soda lime glass substrate is used as the transparent substrates 1 and 1a, it is preferable to coat the transparent substrates with a silicon dioxide thin film so as to prevent a possible pollution problem caused by sodium ions which flow out from the inside of the substrates. Further, when a transparent plastic substrate is used in place of the glass substrate, it is preferable to coat a silicon dioxide thin film on top of a hard coating containing polyorganosiloxane, because there is a possibility that moisture can leak out from the inside of the substrates.

A predetermined number m (m is a positive integer) of pairs of a high refractive index transparent film 7 and a low refractive index transparent film 8 are stacked on an inner surface of the transparent substrate 1. The former transparent film 7 is composed of a dielectric material having a low light absorption and a high refractive index, and the latter transparent film 8 is composed of a dielectric material having a low light absorption and a low refractive index. The low refractive index transparent film 8 is stacked on the high refractive index transparent film 7, but the stacking order may be reversed. Further, a transparent roughened surface scattering layer 12 formed by applying and pressing a thermosetting organic resin (e.g. acrylic resin or the like) may be stacked on the inner surface of the transparent substrate 1. Although not shown, the transparent roughened surface scattering layer 12 presents micro irregularities on its surface and these micro irregularities cause irregular reflection of reflected light, which can suppress the glare of the finished product. Further, it is preferable that the refractive index of the transparent roughened surface scattering layer 12 be almost the same as that of the transparent substrates 1 and 1a.

The predetermined number m of pairs of the high refractive index transparent film 7 and the low refractive index transparent film 8 function as reflecting films which reflect light. That is, by giving a suitable thickness to each of the high refractive index transparent film 7 and the low refractive index transparent film 8 and setting the predetermined number m to a suitable number, it is possible to set the light transmittance and the light reflectance to desired values.

The above-mentioned light transmittance and light reflectance are set according to required specifications (applications) of the design of the substrate for liquid crystal elements. For example, the light reflectance is set within a range of 5 to 95%, as follows: When the substrate is to be frequently used under a relatively bright environment as a substrate of a reflective type liquid crystal display element, the light reflectance is set to a high value (65 to 95%), while when the substrate is to be frequently used under a relatively dark environment as a substrate of a transparent type liquid crystal display element, the light reflectance is set to a low value (5 to 45%). When the light reflectance is set within a range of 45 to 65%, it is possible to manufacture a liquid crystal display element which is suitable for use as both a reflective type and a transparent type display element.

In FIG. 2, a transparent film 8a, which is either the high refractive index transparent film 7 or the low refractive index transparent film 8 but is located farthest from the transparent substrate 1, has stacked thereon a tessellated color filter 9, an overcoat 10 for protecting the color filter 9, and a transparent conductive film 6 composed of indium-tin-oxide (ITO) or the like. Further, a crystal layer 11 is placed between the transparent conductive film 6 and a transparent conductive film 6a. However, the above described layers 9, 10, 6, 6a stacked on the transparent film 8a may be replaced by a single optically equivalent transparent layer (matching oil) 13. The refractive index of the matching oil is in a range of 1.5–1.6, and preferably, 1.55.

As the material having a high refractive index used for the high refractive index transparent film 7, it is preferable to use a dielectric material which has a refractive index of 1.8 or more and has a low light absorption. Specifically, titanium dioxide, zirconium dioxide, tantalum pentoxide, tin oxide, or the like is preferred. Further, as the material having a low refractive index used for the low refractive index transparent film 8, it is preferable to use a dielectric material which has a refractive index of 1.5 or less and has a low light absorption. Specifically, silicon dioxide, magnesium fluoride, calcium fluoride, lithium fluoride, or the like is preferred. It is preferable that the thickness of each transparent film is in a range of 5–200 nm, however, to be exact, an optimum thickness to achieve desired optical characteristics should be selected.

It is preferable to set the optimum thickness as follows, according to required light reflectance and number of pairs (number of stacked layers, hereinafter referred to as "stacking number") of the high refractive index transparent film 7 and the low refractive index transparent film 8 in the visible light region, under the condition that the difference between the maximum value and minimum value of light reflectance of wavelength components red (R), green (G), and blue (B) in the visible light region is kept at approximately 10% or less:

(1) Light Reflectance of 5%–24%
  (i) when the stacking number m is 1 high refractive index transparent film 7: 20–130 nm low refractive index transparent film 8: 50–110 nm
  (ii) when the stacking number m is 2 transparent film 7: 5–60 nm transparent film 8: 5–150 nm
  (iii) when the stacking number m is 3 transparent film 7: 3–80 nm transparent film 8: 5–160 nm
  (iv) when the stacking number m is 4 transparent film 7: 5–80 nm transparent film 8: 5–80 nm (2) Light Reflectance of 25%–44%
  (i) when the stacking number m is 1 transparent film 7: 80–110 nm transparent film 8: 40–60 nm
  (ii) when the stacking number m is 2 transparent film 7: 20–180 nm transparent film 8: 30–100 nm
  (iii) when the stacking number m is 3 transparent film 7: 10–130 nm transparent film 8: 10–170 nm
  (iv) when the stacking number m is 4 transparent film 7: 20–110 nm transparent film 8: 5–100 nm
  (v) when the stacking number m is 5 transparent film 7: 10–110 nm transparent film 8: 5–110 nm
  (vi) when the stacking number m is 6 transparent film 7: 10–80 nm transparent film 8: 30–100 nm (3) Light Reflectance of 45%–64%
  (i) when the stacking number m is 2 transparent film 7: 60–180 nm transparent film 8: 40–90 nm
  (ii) when the stacking number m is 3 transparent film 7: 20–160 nm transparent film 8: 10–150 nm
  (iii) when the stacking number m is 4 transparent film 7: 20–180 nm transparent film 8: 10–110 nm
  (iv) when the stacking number m is 5 transparent film 7: 30–190 nm transparent film 8: 10–140 nm
  (v) when the stacking number m is 6 transparent film 7: 10–150 nm transparent film 8: 10–100 nm
  (vi) when the stacking number m is 7 transparent film 7: 20–150 nm transparent film 8: 5–110 nm
  (vii) when the stacking number m is 8 transparent film 7: 20–130 nm transparent film 8: 5–110 nm
  (viii) when the stacking number m is 9 transparent film 7: 20–120 nm transparent film 8: 10–90 nm (4) Light Reflectance of 65%–94%
  (i) when the stacking number m is 3 transparent film 7: 80–160 nm transparent film 8: 40–110 nm
  (ii) when the stacking number m is 4 transparent film 7: 60–140 nm transparent film 8: 40–100 nm
  (iii) when the stacking number m is 5 transparent film 7: 30–130 nm transparent film 8: 20–170 nm
  (iv) when the stacking number m is 6 transparent film 7: 20–180 nm transparent film 8: 10–140 nm
  (v) when the stacking number m is 7 transparent film 7: 10–150 nm transparent film 8: 30–130 nm
  (vi) when the stacking number m is 8 transparent film 7: 5–200 nm transparent film 8: 5–150 nm
  (vii) when the stacking number m is 9 transparent film 7: 5–200 nm transparent film 8: 5–140 nm If the transparent film 8a which is located farthest from the transparent substrate 1 is a low refractive index transparent thin film 8, it is preferable that its thickness is 20 nm or more from a view point of enhancing its adhesion to the color filter 9. Further, it is preferable that the material for the transparent film 8a is silicon dioxide. A preferable method of forming the above high refractive index transparent film 7, low refractive index transparent film 8 and transparent film 8a mainly includes ion plating, electron beam heated evaporation, and sputtering. However, other methods may be employed.

According to the present embodiment, by stacking in multiple layers a predetermined number m of pairs of the high refractive index transparent film 7 and the low refractive index transparent film 8 which are composed of dielectric materials having different refractive indices, it is possible to set the light reflectance in the visible light region to 5–95% and thus meet a variety of required optical characteristics, compared with the conventional substrate for liquid crystal display elements which has a metallic thin film stacked on the back side transparent substrate 1. Further, since the high refractive index transparent film 7 and low refractive index transparent film 8 are composed of low light absorption dielectric materials, the utilization factor of light can be improved due to the reduced amount of light absorption. Besides, the possibility of a signal delay can be eliminated.

EXAMPLES

Next, examples of the present invention will be explained.

Example 1

First, the above-mentioned transparent substrate 1 for the back side was prepared from a soda lime glass material (consisting essentially of 72 weight % of $SiO_2$, 13 weight % of $Na_2O$, 8 weight % of CaO, 1.8 weight % of $Al_2O_3$ and 0.9 weight % of $K_2O$). Then, on one surface of the prepared transparent substrate 1, pairs of the high refractive index transparent film 7 and the low refractive index transparent film 8 were stacked in stacking numbers indicated in Table 1 and with thicknesses indicated therein, followed by stacking the matching oil 13 having a refractive index of 1.55 and the transparent substrate 1a, to thereby prepare test pieces as Examples Nos. 1–17. As materials for the high refractive index transparent film 7 and the low refractive index transparent film 8, titanium dioxide ($TiO_2$) and silicon dioxide ($SiO_2$) were used, respectively (the same applies to the following examples). Further, the thickness of each of the transparent films 7 and 8 was set according to the stacking number so that the light reflectance in the visible light region was in the range of not less than 5% but less than 25%.

The above test pieces were each irradiated with visible light from one side surface thereof, and the light transmittance (%) and light reflectance (%) of wavelength components R, G and B of transmitted light and reflected light corresponding to the visible light were measured. The measurement results are shown in Table 1.

In Table 1, the letter "S" listed under a column "FILM-FORMING METHOD" refers to a film formed by sputtering, while the letter "E" refers to a film formed by vacuum evaporation. The stacking number m indicates the number of pairs of the high refractive index transparent film 7 and the low refractive index transparent film 8. The letter "H" listed under a column "LAYER" indicates the film thickness of the high refractive index transparent film 7, and "L" indicates the same of the low refractive index transparent film 8. The light transmittance (%) refers to the percentage of a wavelength component R, G or B of visible light transmitted through a test piece, and the light reflectance (%) refers to the percentage of a wavelength component R, G or B of visible light reflected through a test piece. The symbol Δ indicates the difference between the maximum value and minimum value of light reflectance of wavelength components R, G, and B. The same applies to the following tables.

It will be learned from Table 1 that by setting the stacking number of pairs and the film thickness of each of the high refractive index transparent film 7 and the low refractive index transparent film 8 to values indicated in Table 1, the difference between the maximum value and minimum value of light reflectance of wavelength components R, G, and B of Examples Nos. 1 to 17 can be kept at approximately 10% or less when the light reflectance in the visible light region is in the range of not less than 5% but less than 25%.

Example 2

Next, on one surface of the transparent substrate 1, pairs of the high refractive index

TABLE 1

| EX-AMPLES | FILM-FORMING METHOD | STACKING NUMBER m | LAYER THICKNESS (UNIT: nm) | | | | | | | | LIGHT TRANSMITTANCE (% at λ = 550 nm) | | | | LIGHT REFLECTANCE (% at λ = 550 nm) | | | |
|---|---|---|---|---|---|---|---|---|---|---|---|---|---|---|---|---|---|---|
| | | | H | L | H | L | H | L | H | L | B | G | R | Δ | B | G | R | Δ |
| 1 | S | 1 | 21.1 | 96.3 | | | | | | | 93.2 | 91.4 | 84.3 | 8.9 | 6.3 | 8.2 | 14.9 | 8.6 |
| 2 | E | | 21.4 | 105.2 | | | | | | | 94.3 | 92.4 | 87.7 | 6.6 | 5.1 | 7.2 | 11.4 | 6.3 |
| 3 | S | | 21.2 | 60.7 | | | | | | | 77.8 | 75.8 | 76.6 | 2.0 | 21.8 | 23.8 | 22.7 | 2.0 |
| 4 | E | | 125.7 | 58.7 | | | | | | | 80.6 | 80.4 | 81.6 | 1.2 | 18.9 | 19.3 | 17.7 | 1.6 |
| 5 | E | | 95.1 | 57.6 | | | | | | | 78.7 | 79.9 | 81.9 | 3.2 | 20.9 | 19.8 | 17.3 | 3.6 |
| 6 | E | | 94.0 | 57.0 | | | | | | | 78.5 | 79.9 | 82.1 | 3.6 | 21.1 | 19.7 | 17.2 | 3.9 |
| 7 | S | 2 | 27.0 | 10.5 | 38.2 | 22.3 | | | | | 90.7 | 90.6 | 90.4 | 0.3 | 8.8 | 9.0 | 8.8 | 0.2 |
| 8 | E | | 21.2 | 129.6 | 6.4 | 132.4 | | | | | 87.9 | 92.7 | 91.4 | 4.8 | 11.4 | 6.8 | 7.8 | 4.6 |
| 9 | S | | 36.6 | 6.8 | 47.5 | 59.0 | | | | | 79.6 | 80.0 | 80.2 | 0.6 | 20.0 | 19.7 | 19.1 | 0.9 |
| 10 | E | | 46.8 | 98.3 | 50.3 | 143.8 | | | | | 77.8 | 83.3 | 84.6 | 6.8 | 21.5 | 16.3 | 14.6 | 6.9 |
| 11 | S | 3 | 31.7 | 6.7 | 62.9 | 18.7 | 33.0 | 29.6 | | | 90.4 | 90.5 | 90.3 | 0.2 | 9.1 | 9.1 | 8.9 | 0.2 |
| 12 | E | | 21.2 | 122.6 | 6.1 | 161.0 | 6.0 | 135.9 | | | 84.9 | 84.1 | 93.5 | 9.4 | 14.2 | 15.5 | 5.6 | 9.9 |
| 13 | S | | 25.2 | 6.3 | 77.9 | 12.6 | 60.5 | 69.7 | | | 79.3 | 79.9 | 79.7 | 0.6 | 20.2 | 19.8 | 19.6 | 0.6 |
| 14 | E | | 21.3 | 103.7 | 21.6 | 100.6 | 26.3 | 150.2 | | | 83.2 | 84.4 | 78.0 | 6.4 | 15.9 | 15.2 | 21.3 | 6.1 |
| 15 | S | | 4.2 | 108.2 | 6.6 | 97.7 | 68.0 | 98.8 | | | 68.7 | 71.6 | 69.8 | 2.9 | 30.4 | 27.6 | 28.5 | 2.8 |
| 16 | E | 4 | 30.5 | 7.1 | 68.1 | 16.9 | 45.5 | 33.1 | 10.9 | 38.2 | 90.2 | 90.3 | 90.1 | 0.2 | 9.2 | 9.3 | 9.1 | 0.2 |
| 17 | E | | 22.0 | 10.0 | 52.5 | 26.6 | 45.9 | 27.9 | 72.1 | 78.6 | 79.5 | 80.3 | 79.8 | 0.8 | 19.9 | 19.3 | 19.4 | 0.6 | transparent film 7 and the low refractive index transparent film 8 were stacked in stacking numbers indicated in Table 2 and with thicknesses indicated therein, followed by stacking the matching oil 13 having a refractive index of 1.55 and the transparent substrate 1a, to thereby prepare test pieces as Examples Nos. 18–39. The test pieces were measured in the same manner as in Example 1, and the results are shown in Table 2. Further, the thickness of each of the transparent films 7 and 8 was set according to the stacking number so that the light reflectance in the visible light region was in the range of not less than 25% but less than 45%.

It will be learned from Table 2 that by setting the stacking number of pairs and the film thickness of each of the high refractive index transparent film 7 and the low refractive index transparent film 8 to values indicated in Table 2, the difference between the maximum value and minimum value of light reflectance of wavelength components R, G and B of Examples Nos. 18 to 39 can be kept at approximately 10% or less when the light reflectance in the visible light region is in the range of not less than 25% but less than 45%.

Example 3

Tables 3 and 4 show results obtained by measurements carried out in the same manner as in Example 1, but when the light reflectance in the visible light region is in the range of not less than 45% but less than 65%.

It will be learned from Tables 3 and 4 that by setting the stacking number of pairs and the film thickness of each of the high refractive index transparent film 7 and the low refractive index transparent film 8 to values indicated in Tables 3 and 4, the difference between the maximum value and

TABLE 2

| EXAMPLES | FILM-FORMING METHOD | STACKING NUMBER m | LAYER THICKNESS (UNIT: nm) | | | | | | | | | | |
|---|---|---|---|---|---|---|---|---|---|---|---|---|---|
| | | | H | L | H | L | H | L | H | L | H | L | H | L |
| 18 | S | 1 | 98.3 | 52.7 | | | | | | | | | |
| 19 | S | | 95.4 | 51.5 | | | | | | | | | |
| 20 | S | | 94.3 | 51.2 | | | | | | | | | |
| 21 | S | 2 | 21.3 | 52.1 | 37.9 | 93.7 | | | | | | | |
| 22 | E | | 36.8 | 36.5 | 94.5 | 91.6 | | | | | | | |
| 23 | S | | 45.5 | 32.1 | 92.9 | 81.7 | | | | | | | |
| 24 | E | | 81.9 | 52.5 | 88.6 | 94.2 | | | | | | | |
| 25 | E | | 167.2 | 57.0 | 94.9 | 57.1 | | | | | | | |
| 26 | E | | 173.8 | 57.2 | 95.0 | 57.7 | | | | | | | |
| 27 | S | 3 | 22.2 | 12.7 | 65.1 | 19.3 | 101.0 | 70.2 | | | | | |
| 28 | E | | 27.8 | 24.5 | 32.4 | 62.2 | 82.5 | 80.4 | | | | | |
| 29 | S | | 25.8 | 20.8 | 34.2 | 50.8 | 84.1 | 71.2 | | | | | |
| 30 | E | | 75.9 | 14.5 | 96.7 | 62.1 | 100.5 | 95.1 | | | | | |
| 31 | S | | 16.3 | 39.5 | 53.9 | 93.4 | 64.2 | 141.1 | | | | | |
| 32 | S | | 11.4 | 64.1 | 23.7 | 116.7 | 63.7 | 159.2 | | | | | |
| 33 | S | 4 | 28.8 | 17.7 | 48.1 | 33.7 | 53.2 | 6.3 | 26.5 | 68.7 | | | |
| 34 | E | | 68.4 | 18.9 | 74.1 | 46.7 | 28.7 | 97.0 | 103.1 | 90.7 | | | |

TABLE 2-continued

| | | | | | | | | | | | | | |
|---|---|---|---|---|---|---|---|---|---|---|---|---|---|
| 35 | S | | 67.7 | 16.4 | 72.9 | 42.4 | 26.8 | 84.6 | 107.9 | 80.0 | | | |
| 36 | E | | 21.6 | 27.7 | 60.0 | 42.7 | 64.9 | 88.1 | 87.2 | 92.1 | | | |
| 37 | E | 5 | 33.0 | 17.9 | 54.9 | 51.8 | 29.5 | 66.2 | 18.2 | 100.3 | 84.1 | 88.8 | | |
| 38 | E | | 24.2 | 20.5 | 76.0 | 31.0 | 89.2 | 76.9 | 107.2 | 94.4 | 39.7 | 7.3 | | |
| 39 | E | 6 | 75.5 | 90.1 | 61.7 | 42.5 | 26.1 | 78.9 | 13.6 | 44.6 | 26.1 | 57.2 | 17.1 | 38.3 |

| | LIGHT TRANSMITTANCE (% at λ = 550 nm) | | | | LIGHT REFLECTANCE (% at λ = 550 nm) | | | |
|---|---|---|---|---|---|---|---|---|
| EXAMPLES | B | G | R | Δ | B | G | R | Δ |
| 18 | 72.4 | 73.1 | 74.3 | 1.9 | 27.2 | 26.6 | 25.0 | 2.2 |
| 19 | 71.8 | 73.2 | 73.8 | 2.0 | 27.9 | 26.5 | 25.6 | 2.3 |
| 20 | 71.6 | 73.2 | 73.9 | 2.3 | 28.1 | 26.5 | 25.4 | 2.7 |
| 21 | 71.4 | 62.1 | 67.4 | 9.3 | 28.1 | 37.6 | 32.0 | 9.5 |
| 22 | 75.7 | 66.1 | 67.8 | 9.6 | 23.7 | 33.6 | 31.6 | 9.9 |
| 23 | 63.5 | 55.0 | 56.8 | 8.5 | 36.2 | 44.7 | 42.6 | 8.5 |
| 24 | 69.3 | 60.6 | 59.8 | 9.5 | 30.2 | 39.1 | 39.7 | 9.5 |
| 25 | 55.7 | 54.9 | 60.1 | 5.2 | 43.9 | 44.8 | 39.4 | 5.4 |
| 26 | 55.9 | 52.5 | 60.0 | 4.9 | 43.7 | 44.7 | 39.5 | 5.2 |
| 27 | 67.5 | 70.4 | 69.4 | 2.9 | 32.2 | 29.3 | 29.9 | 2.9 |
| 28 | 69.1 | 70.6 | 69.1 | 1.5 | 30.4 | 29.1 | 30.2 | 1.3 |
| 29 | 58.2 | 60.3 | 58.4 | 2.1 | 41.5 | 39.4 | 41.1 | 2.1 |
| 30 | 65.5 | 58.0 | 58.5 | 7.5 | 34.0 | 41.8 | 41.0 | 7.8 |
| 31 | 50.5 | 52.8 | 50.9 | 2.3 | 48.5 | 46.4 | 47.4 | 2.1 |
| 32 | 58.8 | 62.2 | 59.8 | 3.4 | 40.2 | 37.0 | 38.5 | 3.2 |
| 33 | 67.3 | 70.7 | 69.0 | 3.4 | 32.3 | 29.0 | 30.4 | 3.3 |
| 34 | 71.7 | 68.5 | 70.5 | 3.2 | 27.7 | 31.1 | 28.8 | 3.4 |
| 35 | 63.5 | 57.8 | 60.5 | 5.7 | 36.1 | 41.9 | 38.9 | 5.8 |
| 36 | 62.0 | 58.3 | 59.6 | 3.7 | 37.5 | 41.5 | 39.9 | 4.0 |
| 37 | 70.5 | 70.8 | 69.5 | 1.3 | 28.8 | 28.8 | 29.8 | 1.0 |
| 38 | 61.6 | 59.1 | 59.6 | 2.5 | 37.9 | 40.6 | 39.8 | 2.7 |
| 39 | 39.2 | 40.0 | 40.2 | 1.0 | 60.5 | 59.8 | 59.6 | 1.1 |

TABLE 3

| EX- AMPLES | FILM- FORM- ING METHOD | STACK- ING NUMBER m | LAYER THICKNESS (UNIT: nm) | | | | | | | | LIGHT TRANSMITTANCE (% at λ = 550 nm) | | | | LIGHT REFLECTANCE (% at λ = 550 nm) | | | |
|---|---|---|---|---|---|---|---|---|---|---|---|---|---|---|---|---|---|---|
| | | | H | L | H | L | H | L | H | L | B | G | R | Δ | B | G | R | Δ |
| 40 | S | 2 | 79.3 | 45.6 | 86.7 | 83.6 | | | | | 54.2 | 47.8 | 48.0 | 6.4 | 45.5 | 52.0 | 51.5 | 6.5 |
| 41 | S | | 64.0 | 50.8 | 95.4 | 52.4 | | | | | 41.1 | 38.6 | 47.7 | 9.1 | 58.7 | 61.3 | 51.8 | 9.5 |
| 42 | S | | 168.7 | 50.9 | 95.1 | 51.0 | | | | | 42.2 | 39.1 | 47.5 | 8.4 | 57.5 | 60.7 | 52.0 | 8.7 |
| 43 | S | | 160.8 | 50.9 | 95.0 | 50.8 | | | | | 42.4 | 38.9 | 47.4 | 8.5 | 57.3 | 61.0 | 52.2 | 8.8 |
| 44 | S | | 102.3 | 50.8 | 95.1 | 51.0 | | | | | 41.2 | 38.1 | 47.2 | 9.1 | 58.5 | 61.8 | 52.4 | 9.4 |
| 45 | S | 3 | 108.0 | 72.1 | 94.6 | 48.9 | 87.5 | 111.9 | | | 38.0 | 39.3 | 35.3 | 4.0 | 61.8 | 60.6 | 64.5 | 3.9 |
| 46 | E | | 136.8 | 63.7 | 95.8 | 55.3 | 90.9 | 113.7 | | | 44.4 | 45.3 | 40.9 | 4.4 | 55.2 | 54.5 | 58.7 | 4.2 |
| 47 | E | | 134.0 | 59.6 | 95.4 | 55.7 | 93.2 | 110.6 | | | 44.4 | 43.2 | 40.6 | 3.8 | 55.3 | 56.6 | 59.0 | 3.8 |
| 48 | E | | 116.4 | 58.6 | 95.4 | 55.8 | 94.1 | 108.4 | | | 44.5 | 41.9 | 40.4 | 4.1 | 55.1 | 57.9 | 59.2 | 4.1 |
| 49 | S | | 90.3 | 13.0 | 85.3 | 58.4 | 97.7 | 84.6 | | | 53.8 | 45.9 | 47.5 | 7.9 | 45.9 | 53.9 | 52.1 | 8.0 |
| 50 | E | | 69.6 | 49.4 | 87.6 | 55.6 | 148.0 | 93.5 | | | 46.8 | 53.9 | 46.4 | 7.5 | 52.8 | 45.8 | 53.1 | 7.3 |
| 51 | S | | 70.2 | 43.5 | 86.2 | 48.9 | 151.4 | 87.1 | | | 34.2 | 42.6 | 35.4 | 8.4 | 65.6 | 57.2 | 64.3 | 8.4 |
| 52 | E | | 113.0 | 78.5 | 95.8 | 54.8 | 87.5 | 124.4 | | | 51.6 | 51.3 | 43.6 | 8.0 | 47.9 | 48.4 | 56.0 | 8.1 |
| 53 | E | | 82.4 | 52.1 | 66.6 | 26.7 | 25.5 | 26.0 | | | 66.0 | 69.8 | 66.6 | 3.8 | 32.6 | 29.4 | 31.7 | 3.2 |
| 54 | S | 4 | 46.6 | 12.0 | 38.3 | 104.5 | 171.6 | 58.5 | 99.9 | 39.1 | 47.2 | 52.0 | 52.2 | 5.0 | 52.5 | 47.8 | 47.3 | 5.2 |
| 55 | E | | 76.6 | 37.2 | 39.0 | 52.8 | 91.8 | 69.8 | 105.0 | 83.9 | 53.6 | 49.7 | 50.3 | 3.9 | 45.9 | 50.1 | 49.2 | 4.2 |
| 56 | S | | 82.5 | 47.0 | 91.3 | 48.8 | 161.7 | 83.7 | 25.1 | 10.7 | 43.8 | 46.9 | 39.3 | 7.6 | 56.0 | 52.9 | 60.3 | 7.4 |
| 57 | E | | 69.4 | 44.3 | 87.3 | 56.3 | 98.1 | 87.5 | 133.1 | 97.5 | 49.4 | 49.1 | 39.6 | 9.8 | 50.1 | 50.7 | 60.1 | 10.0 |
| 58 | E | | 81.2 | 52.6 | 91.0 | 55.6 | 94.6 | 97.0 | 113.2 | 101.1 | 48.3 | 47.5 | 39.3 | 9.0 | 51.2 | 52.3 | 60.5 | 9.3 |

TABLE 4

| EXAMPLES | FILM- FORMING METHOD | STACKING NUMBER m | LAYER THICKNESS (UNIT: nm) | | | | | | | | | | | |
|---|---|---|---|---|---|---|---|---|---|---|---|---|---|---|
| | | | H | L | H | L | H | L | H | L | H | L | H | L |
| 59 | S | 5 | 30.4 | 98.4 | 149.0 | 69.7 | 117.1 | 24.4 | 67.2 | 86.0 | 188.5 | 113.4 | | |
| 60 | E | | 62.0 | 34.4 | 67.6 | 58.1 | 42.5 | 98.3 | 64.9 | 90.0 | 123.8 | 92.7 | | |
| 61 | S | | 41.2 | 16.5 | 91.9 | 17.6 | 95.2 | 139.6 | 92.2 | 73.9 | 94.9 | 79.7 | | |
| 62 | E | | 89.7 | 42.4 | 44.8 | 52.3 | 95.5 | 63.1 | 120.2 | 71.1 | 168.1 | 17.9 | | |
| 63 | S | 6 | 45.0 | 13.1 | 53.4 | 26.1 | 31.8 | 18.0 | 66.8 | 15.4 | 70.0 | 54.5 | 100.8 | 69.4 |

TABLE 4-continued

| | | | | | | | | | | | | | | | |
|---|---|---|---|---|---|---|---|---|---|---|---|---|---|---|---|
| 64 | E | | 23.3 | 31.2 | 38.6 | 33.7 | 71.5 | 17.6 | 92.8 | 65.5 | 86.1 | 55.1 | 145.8 | 95.2 |
| 65 | S | | 54.7 | 20.9 | 32.7 | 91.1 | 28.4 | 43.9 | 62.3 | 24.9 | 126.8 | 68.2 | 89.2 | 77.5 |
| 66 | E | | 36.1 | 14.2 | 90.0 | 61.2 | 42.3 | 62.9 | 63.0 | 89.3 | 85.3 | 84.5 | 120.9 | 91.6 |
| 67 | E | | 88.5 | 122.6 | 83.1 | 89.6 | 84.8 | 85.1 | 68.3 | 52.9 | 57.3 | 69.5 | 38.2 | 96.2 |
| 68 | E | | 72.7 | 98.8 | 62.9 | 93.6 | 17.5 | 50.0 | 98.9 | 21.3 | 34.1 | 62.7 | 12.8 | 34.6 |
| 69 | E | | 76.2 | 94.6 | 62.1 | 37.6 | 28.0 | 44.2 | 20.0 | 40.3 | 32.7 | 53.1 | 16.0 | 26.5 |
| 70 | S | 7 | 23.9 | 69.5 | 47.6 | 28.7 | 145.1 | 55.8 | 43.2 | 15.9 | 69.5 | 42.4 | 48.5 | 13.1 |
| 71 | E | | 26.3 | 7.8 | 92.0 | 42.2 | 27.9 | 86.1 | 68.5 | 42.5 | 29.0 | 107.1 | 85.2 | 85.3 |
| 72 | S | | 21.5 | 80.8 | 89.1 | 74.2 | 99.2 | 33.5 | 32.2 | 27.4 | 29.1 | 34.5 | 63.3 | 38.1 |
| 73 | E | | 64.9 | 8.6 | 58.9 | 21.0 | 61.5 | 65.0 | 59.2 | 45.1 | 78.2 | 85.6 | 89.4 | 84.5 |
| 74 | S | 8 | 31.6 | 11.7 | 54.5 | 14.3 | 99.5 | 11.8 | 25.2 | 61.7 | 80.8 | 6.3 | 25.8 | 60.7 |
| 75 | E | | 31.4 | 6.7 | 74.2 | 24.0 | 35.8 | 44.9 | 34.9 | 27.6 | 100.5 | 35.3 | 35.1 | 66.5 |
| 76 | S | | 35.7 | 6.8 | 70.7 | 16.6 | 41.4 | 104.1 | 72.9 | 12.1 | 34.5 | 54.6 | 125.5 | 66.0 |
| 77 | E | | 22.0 | 8.3 | 127.6 | 16.7 | 65.1 | 70.8 | 58.9 | 21.5 | 116.9 | 65.2 | 105.7 | 67.7 |
| 78 | E | 9 | 29.5 | 13.6 | 68.1 | 27.2 | 56.5 | 12.7 | 83.1 | 17.7 | 63.4 | 57.6 | 81.8 | 20.6 |

| | LAYER THICKNESS (UNIT: nm) | | | | | | LIGHT TRANSMITTANCE (% at λ = 550 nm) | | | | LIGHT REFLECTANCE (% at λ = 550 nm) | | | |
|---|---|---|---|---|---|---|---|---|---|---|---|---|---|---|
| EXAMPLES | H | L | H | L | H | L | B | G | R | Δ | B | G | R | Δ |
| 59 | | | | | | | 50.9 | 47.2 | 53.0 | 5.8 | 48.8 | 52.6 | 46.5 | 6.1 |
| 60 | | | | | | | 51.4 | 51.0 | 51.1 | 0.4 | 48.1 | 48.8 | 48.5 | 0.7 |
| 61 | | | | | | | 38.8 | 41.5 | 38.6 | 2.9 | 61.0 | 58.3 | 61.0 | 2.7 |
| 62 | | | | | | | 37.8 | 40.4 | 45.4 | 7.6 | 61.8 | 59.5 | 54.2 | 7.6 |
| 63 | | | | | | | 48.2 | 49.5 | 50.3 | 2.1 | 51.6 | 50.3 | 49.3 | 2.3 |
| 64 | | | | | | | 50.0 | 51.1 | 51.5 | 1.5 | 49.3 | 48.7 | 48.0 | 1.3 |
| 65 | | | | | | | 44.4 | 39.3 | 40.0 | 5.1 | 55.3 | 60.5 | 59.7 | 5.2 |
| 66 | | | | | | | 42.0 | 40.6 | 41.3 | 1.4 | 57.5 | 59.2 | 58.3 | 1.7 |
| 67 | | | | | | | 26.9 | 29.0 | 25.4 | 3.6 | 71.7 | 70.1 | 72.9 | 2.8 |
| 68 | | | | | | | 48.9 | 50.0 | 50.1 | 1.2 | 49.5 | 49.1 | 48.2 | 1.3 |
| 69 | | | | | | | 57.5 | 59.0 | 58.6 | 1.5 | 41.0 | 40.1 | 39.7 | 1.3 |
| 70 | 88.8 | 98.3 | | | | | 45.1 | 46.2 | 46.0 | 1.1 | 54.6 | 53.6 | 53.6 | 1.0 |
| 71 | 107.7 | 89.6 | | | | | 46.7 | 48.7 | 49.2 | 2.5 | 52.7 | 51.1 | 50.3 | 2.4 |
| 72 | 59.5 | 19.0 | | | | | 40.9 | 39.6 | 38.9 | 2.0 | 58.9 | 60.2 | 60.8 | 1.9 |
| 73 | 120.9 | 92.0 | | | | | 43.0 | 40.7 | 41.0 | 2.3 | 56.5 | 59.1 | 58.6 | 2.6 |
| 74 | 79.5 | 20.4 | 106.7 | 12.8 | | | 51.6 | 48.4 | 50.5 | 3.2 | 48.2 | 51.4 | 49.0 | 3.2 |
| 75 | 80.9 | 74.7 | 99.0 | 84.6 | | | 52.1 | 50.4 | 49.9 | 2.2 | 47.2 | 49.4 | 49.6 | 2.4 |
| 76 | 74.5 | 28.8 | 96.1 | 16.9 | | | 39.2 | 40.6 | 39.7 | 1.4 | 60.6 | 59.2 | 59.9 | 1.4 |
| 77 | 116.6 | 87.6 | 37.8 | 6.6 | | | 39.0 | 40.2 | 39.9 | 1.2 | 60.5 | 59.6 | 59.7 | 0.9 |
| 78 | 82.8 | 74.8 | 110.4 | 64.9 | 105.0 | 84.9 | 39.1 | 40.0 | 39.9 | 0.9 | 60.4 | 59.8 | 59.8 | 0.6 | minimum value of light reflectance of wavelength components R, G, and B of Examples Nos. 40 to 78 can be kept at approximately 10% or less when the light reflectance in the visible light region is in the range of not less than 45% but less than 65%.

Example 4

Tables 5 and 6 show results obtained by measurements carried out in the same manner as in Example 1, but when the light reflectance in the visible light region is in the range of not less than 65% but less than 95%.

It will be learned from Tables 5 and 6 that by setting the stacking number of pairs and the film thickness of each of the high refractive index transparent film 7 and the low refractive index transparent film 8 to values indicated in Tables 5 and 6, the difference between the maximum value and minimum value of light reflectance of wavelength components R, G, and B of Examples Nos. 79 to 113 can be kept at approximately 10% or less when the light reflectance in the visible light region is in the range of not less than 65% but less than 95%.

Further, measurements were carried out, in a similar manner to the above, on test pieces which were prepared by additionally stacking the transparent roughened surface scattering layer 12 on the inner surface of the transparent substrate 1 of each of the above test pieces. The measurement results showed that by setting the stacking number of pairs and the film thickness of each of the high refractive index transparent film 7 and the low refractive index transparent film 8 to values indicated in Tables 1 to 6, the difference between the maximum value and minimum value of light reflectance of wavelength components R, G, and B is approximately 10% or less when the light reflectance in the visible light region

TABLE 5

| | FILM-FORMING | STACKING NUMBER | LAYER THICKNESS (UNIT: nm) | | | | | | | | | | |
|---|---|---|---|---|---|---|---|---|---|---|---|---|---|
| EXAMPLES | METHOD | m | H | L | H | L | H | L | H | L | H | L | H | L |
| 79 | S | 3 | 153.9 | 53.7 | 94.2 | 49.2 | 92.9 | 97.4 | | | | | | |
| 80 | E | | 149.2 | 51.9 | 94.4 | 49.5 | 94.1 | 95.6 | | | | | | |

TABLE 5-continued

| | | | | | | | | | | | | | |
|---|---|---|---|---|---|---|---|---|---|---|---|---|---|
| 81 | S | 4 | 79.5 | 46.6 | 90.5 | 49.5 | 93.2 | 84.4 | 123.0 | 89.4 | | | |
| 82 | S | 5 | 48.6 | 25.2 | 41.1 | 45.2 | 43.6 | 129.5 | 97.0 | 55.3 | 102.4 | 63.2 | |
| 83 | E | | 86.3 | 44.8 | 55.1 | 48.4 | 93.7 | 60.6 | 112.0 | 75.5 | 115.3 | 87.3 | |
| 84 | S | | 85.3 | 40.4 | 49.6 | 43.4 | 94.1 | 53.7 | 107.0 | 68.9 | 115.4 | 79.1 | |
| 85 | E | | 83.1 | 42.4 | 67.7 | 49.5 | 93.0 | 60.1 | 119.0 | 74.8 | 116.5 | 85.2 | |
| 86 | S | | 83.0 | 36.5 | 65.5 | 44.8 | 93.6 | 53.1 | 115.0 | 69.0 | 114.8 | 77.6 | |
| 87 | E | | 81.2 | 43.0 | 75.3 | 50.3 | 92.8 | 60.0 | 125.0 | 73.0 | 118.2 | 83.4 | |
| 88 | S | | 77.2 | 106.5 | 61.5 | 95.9 | 51.0 | 88.6 | 42.0 | 36.5 | 41.0 | 82.8 | |
| 89 | S | | 39.3 | 40.4 | 59.9 | 61.2 | 62.7 | 100.4 | 69.7 | 122.0 | 80.0 | 159.1 | |
| 90 | S | 6 | 23.5 | 131.8 | 57.8 | 14.2 | 131.6 | 42.2 | 82.9 | 68.2 | 111.9 | 68.3 | 174.4 | 90.6 |
| 91 | E | | 56.3 | 38.8 | 82.6 | 50.1 | 67.0 | 70.6 | 93.1 | 85.3 | 99.9 | 85.3 | 128.6 | 94.4 |
| 92 | S | | 24.7 | 51.9 | 49.9 | 41.9 | 105.3 | 54.4 | 61.5 | 84.6 | 103.3 | 76.1 | 131.1 | 84.4 |
| 93 | E | | 80.9 | 48.5 | 72.8 | 43.9 | 83.8 | 55.7 | 106.0 | 75.8 | 106.6 | 77.9 | 120.6 | 85.5 |
| 94 | S | | 80.3 | 44.4 | 70.1 | 35.9 | 83.0 | 49.3 | 101.0 | 64.9 | 114.3 | 62.9 | 127.1 | 70.7 |
| 95 | E | | 84.5 | 50.1 | 74.6 | 42.6 | 82.7 | 54.9 | 101.0 | 74.8 | 112.4 | 69.9 | 125.7 | 75.1 |

| | LIGHT TRANSMITTANCE (% at λ = 550 nm) | | | | LIGHT REFLECTANCE (% at λ = 550 nm) | | | |
|---|---|---|---|---|---|---|---|---|
| EXAMPLES | B | G | R | Δ | B | G | R | Δ |
| 79 | 31.2 | 29.7 | 27.1 | 4.1 | 68.7 | 70.2 | 72.7 | 4.0 |
| 80 | 32.1 | 28.6 | 26.8 | 5.3 | 67.7 | 71.3 | 73.0 | 5.3 |
| 81 | 34.2 | 33.5 | 27.3 | 6.9 | 65.6 | 66.4 | 72.5 | 6.9 |
| 82 | 28.4 | 34.1 | 32.3 | 5.7 | 71.5 | 65.8 | 67.4 | 5.7 |
| 83 | 32.1 | 30.3 | 34.6 | 4.3 | 67.5 | 69.6 | 65.0 | 4.6 |
| 84 | 19.9 | 18.2 | 23.5 | 5.3 | 80.0 | 81.8 | 76.3 | 5.5 |
| 85 | 30.2 | 26.1 | 31.8 | 5.7 | 69.5 | 73.8 | 67.9 | 5.9 |
| 86 | 18.5 | 13.5 | 18.4 | 5.0 | 81.4 | 86.4 | 81.5 | 5.0 |
| 87 | 30.0 | 24.4 | 26.9 | 5.6 | 69.7 | 75.5 | 72.9 | 5.8 |
| 88 | 20.0 | 19.7 | 18.5 | 1.5 | 79.0 | 79.5 | 79.8 | 0.8 |
| 89 | 21.2 | 24.5 | 25.8 | 1.3 | 77.8 | 74.8 | 72.5 | 5.3 |
| 90 | 32.7 | 27.1 | 30.7 | 5.6 | 67.2 | 72.8 | 69.0 | 5.6 |
| 91 | 27.7 | 32.6 | 28.7 | 4.9 | 71.9 | 67.3 | 71.1 | 4.6 |
| 92 | 19.0 | 22.2 | 18.9 | 3.3 | 80.9 | 77.7 | 81.0 | 3.3 |
| 93 | 28.5 | 23.3 | 27.1 | 5.2 | 71.1 | 76.6 | 72.6 | 5.5 |
| 94 | 12.8 | 8.6 | 16.5 | 7.9 | 87.2 | 91.3 | 83.3 | 8.0 |
| 95 | 22.5 | 18.6 | 28.5 | 9.9 | 77.2 | 81.3 | 71.3 | 10.0 |

TABLE 6

| EXAMPLES | FILM-FORMING METHOD | STACKING NUMBER m | LAYER THICKNESS (UNIT: nm) | | | | | | | | | | | |
|---|---|---|---|---|---|---|---|---|---|---|---|---|---|---|
| | | | H | L | H | L | H | L | H | L | H | L | H | L |
| 96 | S | 7 | 21.8 | 92.5 | 46.7 | 73.0 | 103.2 | 79.3 | 89.4 | 44.5 | 12.7 | 72.2 | 86.7 | 116.8 |
| 97 | E | | 61.9 | 32.4 | 45.1 | 65.2 | 93.8 | 45.0 | 37.9 | 72.9 | 115.4 | 69.9 | 98.8 | 79.7 |
| 98 | S | | 32.8 | 88.7 | 129.5 | 83.9 | 86.1 | 99.7 | 80.6 | 48.2 | 72.1 | 67.3 | 90.6 | 33.3 |
| 99 | E | | 51.5 | 44.0 | 84.7 | 48.5 | 81.0 | 48.3 | 91.1 | 75.6 | 118.7 | 63.5 | 132.3 | 70.9 |
| 100 | S | | 84.3 | 45.2 | 22.4 | 125.0 | 59.5 | 39.2 | 89.7 | 50.9 | 98.9 | 56.5 | 118.2 | 84.5 |
| 101 | E | | 76.1 | 49.8 | 83.4 | 46.3 | 78.2 | 49.5 | 92.4 | 68.2 | 124.1 | 64.6 | 119.3 | 76.9 |
| 102 | S | 8 | 21.8 | 86.0 | 25.9 | 42.4 | 102.1 | 75.8 | 51.8 | 40.3 | 73.2 | 19.3 | 28.6 | 70.3 |
| 103 | E | | 22.0 | 6.7 | 97.3 | 52.1 | 6.6 | 128.8 | 85.9 | 46.3 | 82.8 | 59.0 | 94.7 | 95.9 |
| 104 | S | | 21.8 | 84.0 | 198.6 | 105.2 | 9.3 | 23.2 | 102.0 | 59.0 | 85.9 | 52.2 | 87.8 | 95.8 |
| 105 | E | | 78.5 | 13.7 | 36.0 | 143.7 | 87.2 | 48.8 | 69.9 | 45.4 | 90.1 | 61.6 | 116.6 | 70.5 |
| 106 | S | | 49.7 | 33.0 | 43.7 | 51.2 | 98.5 | 50.0 | 49.5 | 40.6 | 106.6 | 63.9 | 111.4 | 56.6 |
| 107 | E | | 83.9 | 50.7 | 53.9 | 130.0 | 70.2 | 42.9 | 84.5 | 56.4 | 98.9 | 61.6 | 104.8 | 69.5 |
| 108 | S | 9 | 27.6 | 11.2 | 80.8 | 17.9 | 65.5 | 11.3 | 74.9 | 29.4 | 39.7 | 71.4 | 78.3 | 26.6 |
| 109 | E | | 69.4 | 35.7 | 42.6 | 136.5 | 42.5 | 59.2 | 86.2 | 66.8 | 66.6 | 68.0 | 51.5 | 6.5 |
| 110 | S | | 45.3 | 99.4 | 174.1 | 59.1 | 118.7 | 60.7 | 90.0 | 81.2 | 63.6 | 76.8 | 33.7 | 32.8 |
| 111 | E | | 56.0 | 59.6 | 36.5 | 90.1 | 83.4 | 47.4 | 89.5 | 52.9 | 96.0 | 49.3 | 6.3 | 46.2 |
| 112 | S | | 26.0 | 7.2 | 118.3 | 35.6 | 41.4 | 53.8 | 95.9 | 53.1 | 44.3 | 36.9 | 118.1 | 64.3 |
| 113 | E | | 67.7 | 44.9 | 87.7 | 84.2 | 73.0 | 43.8 | 85.1 | 52.3 | 92.7 | 61.6 | 43.2 | 6.1 |

| EXAMPLES | LAYER THICKNESS (UNIT: nm) | | | | | | LIGHT TRANSMITTANCE (% at λ = 550 nm) | | | | LIGHT REFLECTANCE (% at λ = 550 nm) | | | |
|---|---|---|---|---|---|---|---|---|---|---|---|---|---|---|
| | H | L | H | L | H | L | B | G | R | Δ | B | G | R | Δ |
| 96 | 149.6 | 112.0 | | | | | 29.8 | 29.8 | 27.7 | 2.1 | 70.1 | 70.1 | 72.0 | 1.9 |
| 97 | 114.1 | 89.5 | | | | | 33.4 | 29.2 | 30.1 | 4.2 | 66.1 | 70.7 | 69.6 | 4.6 |
| 98 | 40.8 | 96.7 | | | | | 17.4 | 18.6 | 17.2 | 1.4 | 82.5 | 81.3 | 82.7 | 1.4 |
| 99 | 133.5 | 87.3 | | | | | 17.5 | 24.2 | 22.0 | 6.7 | 82.3 | 75.6 | 77.7 | 6.7 |
| 100 | 121.5 | 68.0 | | | | | 17.0 | 16.8 | 12.9 | 4.1 | 82.9 | 83.1 | 87.0 | 4.1 |

TABLE 6-continued

| 101 | 113.2 | 87.1  |       |       |       |       | 18.7 | 17.1 | 21.8 | 4.7 | 81.1 | 82.8 | 78.0 | 4.8 |
| 102 | 116.8 | 85.3  | 127.5 | 92.5  |       |       | 31.8 | 26.5 | 27.5 | 5.3 | 68.0 | 73.4 | 72.2 | 5.4 |
| 103 | 122.7 | 68.4  | 145.3 | 92.5  |       |       | 30.2 | 29.9 | 30.0 | 0.3 | 69.0 | 70.0 | 69.7 | 1.0 |
| 104 | 90.7  | 104.2 | 137.6 | 87.6  |       |       | 21.0 | 22.8 | 17.7 | 5.1 | 78.9 | 77.1 | 82.1 | 5.0 |
| 105 | 111.5 | 78.0  | 118.2 | 88.4  |       |       | 23.6 | 22.2 | 22.5 | 1.4 | 75.9 | 77.7 | 77.2 | 1.8 |
| 106 | 121.5 | 65.1  | 122.4 | 79.2  |       |       | 10.6 | 9.1  | 9.9  | 1.5 | 89.3 | 90.8 | 90.0 | 1.5 |
| 107 | 154.7 | 78.9  | 112.3 | 72.1  |       |       | 24.3 | 22.7 | 15.1 | 9.2 | 75.3 | 77.2 | 84.8 | 9.5 |
| 108 | 61.4  | 74.3  | 117.9 | 64.9  | 107.4 | 81.2  | 27.8 | 29.0 | 29.0 | 1.2 | 72.1 | 70.9 | 70.8 | 1.3 |
| 109 | 55.5  | 96.7  | 124.1 | 71.9  | 152.8 | 96.4  | 30.9 | 26.7 | 28.6 | 4.2 | 68.3 | 73.2 | 71.2 | 4.9 |
| 110 | 84.9  | 124.4 | 116.6 | 105.7 | 163.6 | 109.8 | 20.1 | 17.8 | 19.9 | 2.3 | 79.8 | 82.2 | 79.9 | 2.4 |
| 111 | 98.2  | 61.7  | 160.6 | 62.6  | 141.5 | 92.4  | 18.7 | 18.1 | 19.3 | 1.2 | 80.9 | 81.8 | 80.6 | 1.2 |
| 112 | 106.5 | 55.7  | 123.3 | 62.4  | 120.5 | 78.0  | 11.0 | 8.8  | 9.4  | 2.2 | 89.0 | 91.1 | 90.5 | 2.1 |
| 113 | 106.5 | 59.4  | 103.3 | 93.2  | 107.8 | 72.6  | 14.8 | 22.3 | 24.0 | 9.2 | 84.9 | 77.6 | 75.7 | 9.2 | is in the range of not less than 5% but less than 95%.

Next, the difference between the light absorptivity of the substrate for liquid crystal display elements of examples of the present invention and that of the conventional substrate for liquid crystal display elements will be described. Here, the light absorptivity is calculated by an equation of 100−(light transmittance+light reflectance), on the assumption that the remainder after subtraction of transmitted light and reflected light from visible light is absorbed. Table 7 shows results of comparisons between the light absorptivity of typical ones of Examples according to the present invention (Examples Nos. 9, 29, 76, 92, 17, 38, 77 and 105) and that of the conventional substrate for liquid crystal display elements (Comparative Examples Nos. 1–4).

Figure 1:
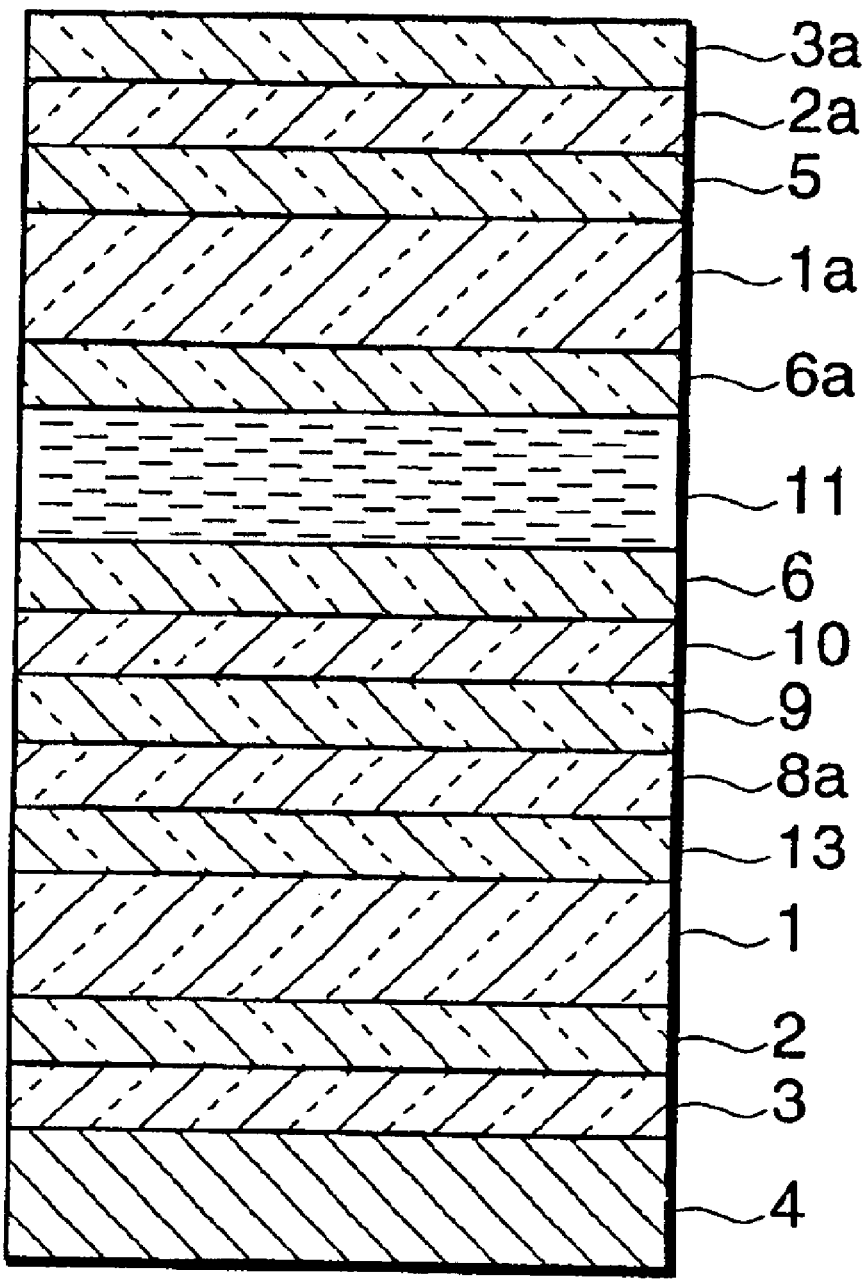
FIG. 1 is a cross-sectional view showing an example of a laminated structure of a conventional liquid crystal display element.

The laminated structure of the liquid crystal display element for Comparative Examples Nos. 1–4 will be briefly described with reference to FIG. 1. FIG. 1 is a cross-sectional view of a typical laminated structure of the conventional liquid crystal display element. The difference from the above described laminated structure of FIG. 2 lies in that in place of the predetermined number m of pairs of the high refractive index transparent film 7 and the low refractive index transparent film 8, a metallic thin film 13 is stacked on the inner surface of the transparent substrate 1.

Test pieces as Comparative Examples Nos. 1–4 were prepared in the same manner as in the above described examples by using soda lime glass for the transparent substrate 1 for the back side.

The prepared test pieces were each irradiated with visible light from one side surface thereof, and the light transmittance (%) and light reflectance (%) of a wavelength component of 550 nm of transmitted

TABLE 7

|  | FILM-FORMING METHOD | STACKING NUMBER m | FILM THICKNESS (nm) | LIGHT TRANSMITTANCE (%) (550 nm) | LIGHT REFLECTANCE (%) (550 nm) | LIGHT ABSORPTANCE (%) (550 nm) |
|---|---|---|---|---|---|---|
| EXAMPLES | | | | | | |
| 9   | S | 2 | 149.9  | 80.0 | 19.7 | 0.3 |
| 29  | S | 3 | 286.9  | 60.3 | 39.4 | 0.3 |
| 76  | S | 8 | 857.2  | 40.6 | 59.2 | 0.2 |
| 92  | E | 6 | 869.1  | 22.2 | 77.7 | 0.1 |
| 17  | E | 4 | 335.6  | 80.3 | 19.3 | 0.4 |
| 38  | E | 5 | 566.4  | 59.1 | 40.6 | 0.3 |
| 77  | E | 8 | 995.0  | 40.2 | 59.6 | 0.2 |
| 105 | E | 8 | 1258.1 | 22.2 | 77.7 | 0.1 |
| COMPARATIVE EXAMPLES | | | | | | |
| 1 | S | 1 | 4.3  | 61.1 | 19.8 | 19.1 |
| 2 | S | 1 | 8.2  | 36.9 | 4.6  | 21.0 |
| 3 | S | 1 | 13.6 | 18.1 | 60.9 | 22.5 |
| 4 | S | 1 | 26.7 | 3.5  | 80.4 | 16.1 | light and reflected light corresponding to the visible light were measured. The measurement results are shown in Table 7.

As will be learned from Table 7, the typical examples according to the present invention have hardly any light absorption and showed very small values of light absorptivity because the predetermined number of pairs of the high refractive index transparent film 7 and the low refractive index transparent film 8 stacked on the surface of the transparent substrate 1 are composed of low light absorptivity dielectric materials. On the other hand, Comparative Examples Nos. 1–4, which each have a semi-transparent metallic thin film formed of aluminum stacked on the transparent substrate 1, whereby light is absorbed by the metallic thin film, so that the value of light absorptivity is large. The results in Table 7 show that Comparative Examples have light absorptivity approximately 20% larger than that of Examples of the present invention.

Figure 3:
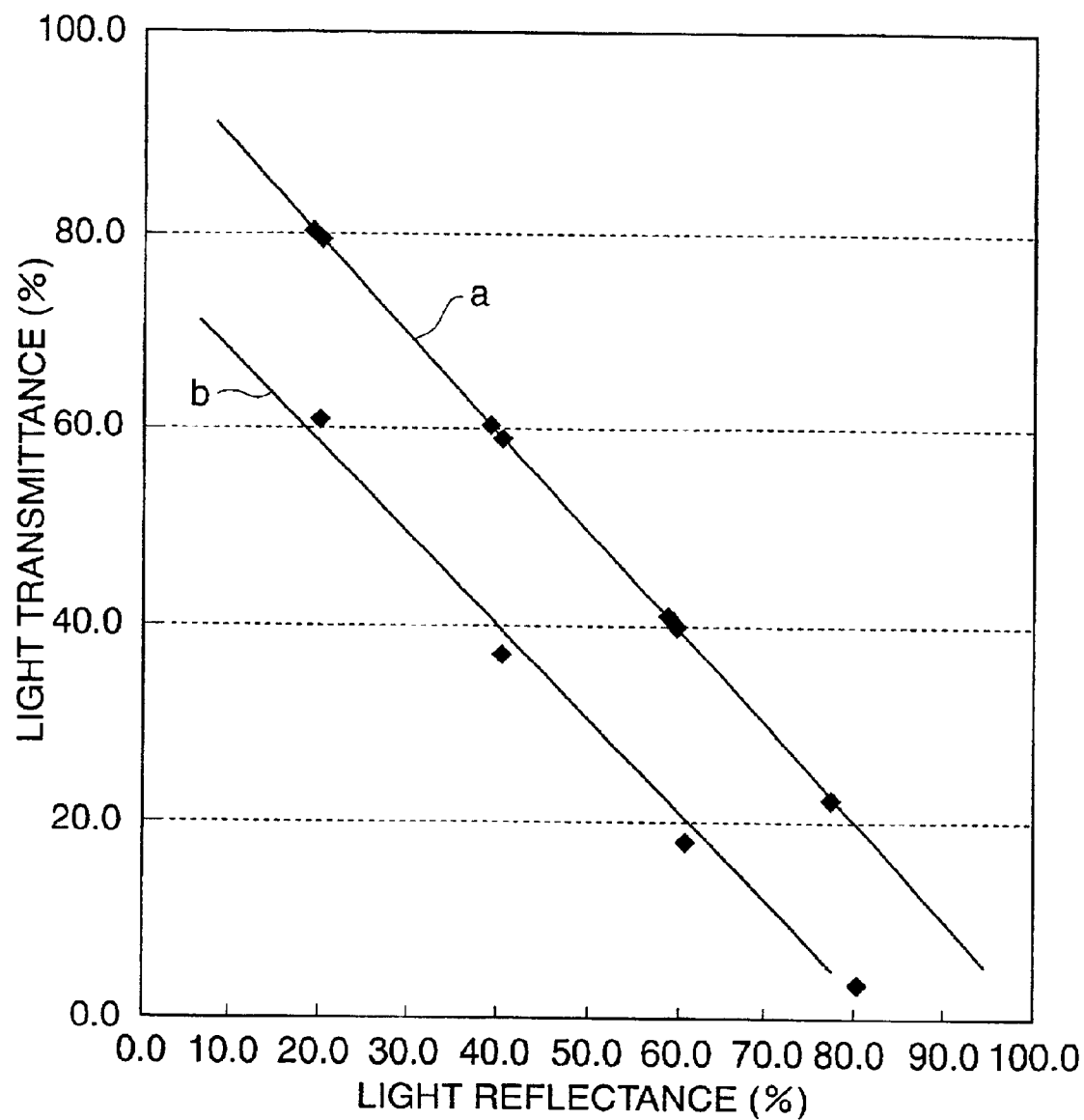
FIG. 3 is a graph showing the relationship in light transmittance and light reflectance between typical examples of the present invention and Comparative Examples Nos. 1–4.

The results in Table 7 are shown in FIG. 3. FIG. 3 is a graph showing the relationship in light transmittance and light reflectance between the typical examples of the present invention and Comparative Examples Nos. 1–4, wherein a indicates a characteristic curve of substrates for liquid crystal display elements according to the typical examples of the present invention, and b indicates a characteristic curve according to Comparative Examples Nos. 1–4.

Figure 4A:
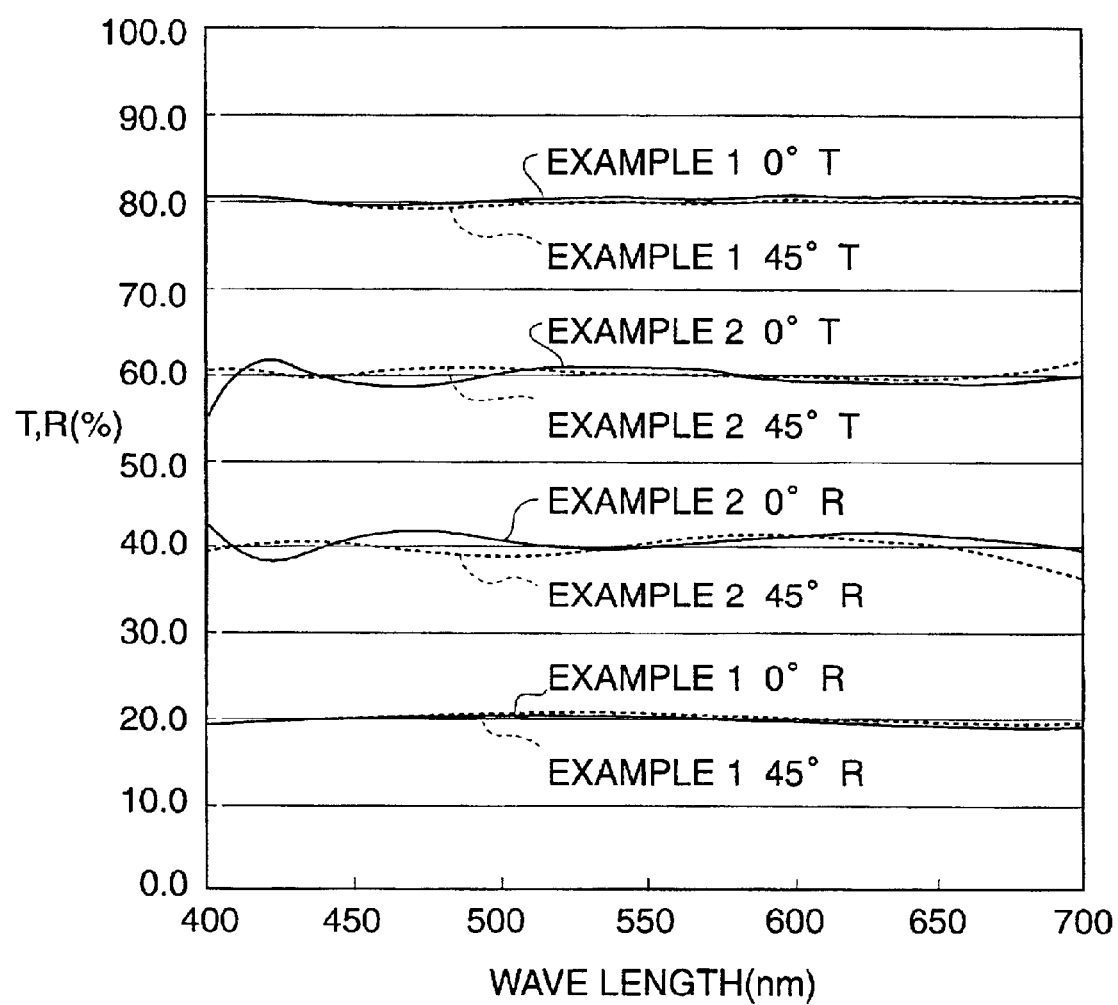
Figure 4B:
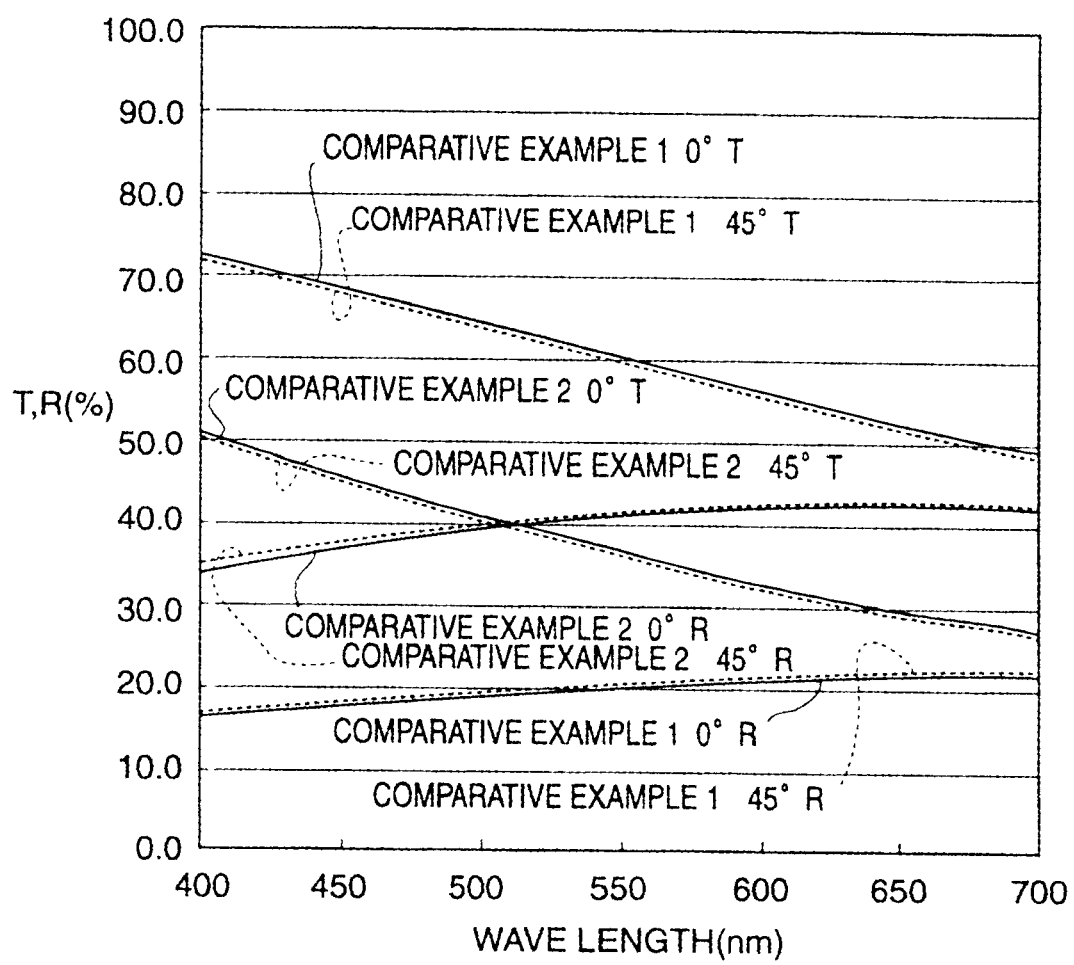

Next, optical characteristics (light transmittance (T [%]), light reflectance (R [%])) of examples of the substrate for liquid crystal display elements according to the present invention and examples of the conventional substrate for liquid crystal display elements will be described with reference to FIGS. 4A and 4B. FIGS. 4A and 4B are graphical representations of optical characteristics (T, R [%]) of the substrate for liquid crystal display elements according to the present invention and those of the conventional substrate, respectively. FIG. 4A shows the optical characteristics of Examples Nos. 1 and 2, and FIG. 4B shows the optical characteristics of Comparative Examples Nos. 1 and 2. In the graphs of FIGS. 4A and 4B, light transmittance and light reflectance when the angle of incidence of light is 0 degrees and 45 degrees are shown, with the abscissa representing wavelength [nm], and the ordinate representing T, R [%].

It can be seen from FIG. 4A that the optical characteristics in the visible light region of Examples Nos. 1 and 2 show flat or generally horizontal characteristic curves, irrespective of the angle of incidence of light, i.e. irrespective of whether it is 0 degrees or 45 degrees, such that no extra color correction or the like is needed when displaying images in colors. On the other hand, as shown in FIG. 4B, the optical characteristics of Comparative Examples Nos. 1 and 2 show unflat or sloped characteristic curves, which requires extra color correction or the like when displaying images in colors.

What is claimed is:

1. A liquid crystal display having a transflective function given by a reflector with a stack of films having a partly transmissive reflection characteristic, comprising:
   a transparent substrate; and
   a said reflector comprising a predetermined number of pairs of a first film having a high refractive index and a second film having a low refractive index, each of said first and second films being composed of a dielectric material, and stacked on said transparent substrate, wherein:
      said first film has a refractive index of light of not less than 1.8 at a wavelength of 550 nm, and said second film is stacked on said first film, said second film having a refractive index of light of not more than 1.5 at the wavelength of 550 nm;
      said predetermined number is an integer not less than 1 and each of said first and second films has a thickness that allows the light reflectance in a visible light region of said reflector to fall within a range of 5–95% and the difference between a maximum value and a minimum value of light reflectance of wavelength components in the visible light region to be approximately 10% or less.

2. A liquid crystal display having a transflective function given by a reflector with a stack of films having a partly transmissive reflection characteristic as claimed in claim 1, including a transparent roughened surface scattering layer stacked on said transparent substrate.

3. A liquid crystal display having a transflective function given by a reflector with a stack of films having a partly transmissive reflection characteristic as claimed in claim 1, wherein said light reflectance in the visible light region of said reflector is in a range of not less than 5% but less than 25%.

4. A liquid crystal display having a transflective function given by a reflector with a stack of films having a partly transmissive reflection characteristic as claimed in claim 3, wherein when said predetermined number is 1, said first film has a film thickness of 20–130 nm, and said second film has a film thickness of 50–110 nm.

5. A liquid crystal display having a transflective function given by a reflector with a stack of films having a partly transmissive reflection characteristic as claimed in claim 3, wherein when said predetermined number is 2, said first film has a film thickness of 5–60 nm, and said second film has a film thickness of 5–150 nm.

6. A liquid crystal display having a transflective function given by a reflector with a stack of films having a partly transmissive reflection characteristic as claimed in claim 3, wherein when said predetermined number is 3, said first film has a film thickness of 3–80 nm, and said second film has a film thickness of 5–160 nm.

7. A liquid crystal display having a transflective function given by a reflector with a stack of films having a partly transmissive reflection characteristic as claimed in claim 3, wherein when said predetermined number is 4, said first film has a film thickness of 5–80 nm, and said second film has a film thickness of 5–80 nm.

8. A liquid crystal display having a transflective function given by a reflector with a stack of films having a partly transmissive reflection characteristic as claimed in claim 1, wherein said light reflectance in the visible light region of said reflector is in a range of not less than 45% but less than 65%.

9. A liquid crystal display having a transflective function given by a reflector with a stack of films having a partly transmissive reflection characteristic as claimed in claim 8, wherein when said predetermined number is 2, said first film has a film thickness of 60–180 nm, and said second film has a film thickness of 40–90 nm.

10. A liquid crystal display having a transflective function given by a reflector with a stack of films having a partly transmissive reflection characteristic as claimed in claim 8, wherein when said predetermined number is 3, said first film has a film thickness of 20–160 nm, and said second film has a film thickness of 10–150 nm.

11. A liquid crystal display having a transflective function given by a reflector with a stack of films having a partly transmissive reflection characteristic as claimed in claim 8, wherein when said predetermined number is 4, said first film has a film thickness of 20–180 nm, and said second film has a film thickness of 10–110 nm.

12. A liquid crystal display having a transflective function given by a reflector with a stack of films having a partly transmissive reflection characteristic as claimed in claim 8, wherein when said predetermined number is 5, said first film has a film thickness of 30–190 nm, and said second film has a film thickness of 10–140 nm.

13. A liquid crystal display having a transflective function given by a reflector with a stack of films having a partly transmissive reflection characteristic as claimed in claim 8, wherein when said predetermined number is 6, said first film has a film thickness of 10–150 nm, and said second film has a film thickness of 10–100 nm.

14. A liquid crystal display having a transflective function given by a reflector with a stack of films having a partly transmissive reflection characteristic as claimed in claim 8, wherein when said predetermined number is 7, said first film has a film thickness of 20–150 nm, and said second film has a film thickness of 5–110 nm.

15. A liquid crystal display having a transflective function given by a reflector with a stack of films having a partly transmissive reflection characteristic as claimed in claim 8, wherein when said predetermined number is 8, said first film has a film thickness of 20–130 nm, and said second film has a film thickness of 5–110 nm.

16. A liquid crystal display having a transflective function given by a reflector with a stack of films having a partly transmissive reflection characteristic as claimed in claim 8, wherein when said predetermined number is 9, said first film has a film thickness of 20–120 nm, and said second film has a film thickness of 10–90 nm.

17. A liquid crystal display having a transflective function given by a reflector with a stack of films having a partly transmissive reflection characteristic as claimed in claim 1, wherein said light reflectance in the visible light region of said reflector is in a range of not less than 65% but less than 95%.

18. A liquid crystal display having a transflective function given by a reflector with a stack of films having a partly transmissive reflection characteristic as claimed in claim 17, wherein when said predetermined number is 3, said first film has a film thickness of 80–160 nm, and said second film has a film thickness of 40–110 nm.

19. A liquid crystal display having a transflective function given by a reflector with a stack of films having a partly transmissive reflection characteristic as claimed in claim 17, wherein when said predetermined number is 4, said first film has a film thickness of 60–140 nm, and said second film has a film thickness of 40–100 nm.

20. A liquid crystal display having a transflective function given by a reflector with a stack of films having a partly transmissive reflection characteristic as claimed in claim 17, wherein when said predetermined number is 5, said first film has a film thickness of 30–130 nm, and said second film has a film thickness of 20–170 nm.

21. A liquid crystal display having a transflective function given by a reflector with a stack of films having a partly transmissive reflection characteristic as claimed in claim 17, wherein when said predetermined number is 6, said first film has a film thickness of 20–180 nm, and said second film has a film thickness of 10–140 nm.

22. A liquid crystal display having a transflective function given by a reflector with a stack of films having a partly transmissive reflection characteristic as claimed in claim 17, wherein when said predetermined number is 7, said first film has a film thickness of 10–150 nm, and said second film has a film thickness of 30–130 nm.

23. A liquid crystal display having a transflective function given by a reflector with a stack of films having a partly transmissive reflection characteristic as claimed in claim 17, wherein when said predetermined number is 8, said first film has a film thickness of 5–200 nm, and said second film has a film thickness of 5–150 nm.

24. A liquid crystal display having a transflective function given by a reflector with a stack of films having a partly transmissive reflection characteristic as claimed in claim 17, wherein when said predetermined number is 9, said first film has a film thickness of 5–200 nm, and said second film has a film thickness of 5–140 nm.

25. A liquid crystal display having a transflective function given by a reflector with a stack of films having a partly transmissive reflection characteristic as claimed in claim 1, wherein said second film is formed of a material having a low refractive index consisting essentially of at least one compound selected from the group consisting of silicon dioxide, magnesium fluoride, calcium fluoride, and lithium fluoride.

26. A liquid crystal display having a transflective function given by a reflector with a stack of films having a partly transmissive reflection characteristic as claimed in claim 1, wherein said second film includes a film located farthest from said transparent substrate, said film being formed of silicon dioxide and having a film thickness of not less than 20 nm.

27. A liquid crystal display having a transflective function given by a reflector with a stack of films having a partly transmissive reflection characteristic as claimed in claim 1, wherein said first film is formed of a material having a high refractive index consisting essentially of at least one compound selected from the group consisting of titanium dioxide, zirconium dioxide, tantalum pentoxide, and tin oxide.

\* \* \* \* \*

UNITED STATES PATENT AND TRADEMARK OFFICE
CERTIFICATE OF CORRECTION

PATENT NO. : 6,778,241 B1
DATED : August 17, 2004
INVENTOR(S) : Daisuke Arai et al.

It is certified that error appears in the above-identified patent and that said Letters Patent is hereby corrected as shown below:

Title page,
Item [54], Title, delete "SUBSTRATE FOR LIQUID CRYSTAL DISPLAY ELEMENTS" and insert -- SUBSTRATE FOR LIQUID CRYSTAL DISPLAY ELEMENTS HAVING A FIRST FILM HAVING A HIGH REFRACTIVE INDEX AND A SECOND FILM HAVING A LOW REFRACTIVE INDEX --.

Signed and Sealed this

First Day of February, 2005

JON W. DUDAS
*Director of the United States Patent and Trademark Office*